3,575,690
HYDROGEN RECOVERY PROCESS
Raymond F. Wilson, Reese A. Peck, and Frank E. Guptill, Jr., Fishkill, N.Y., assignors to Texaco, Inc., New York, N.Y.
No Drawing. Filed Mar. 28, 1969, Ser. No. 811,634
Int. Cl. C01b 1/18
U.S. Cl. 23—212
13 Claims

ABSTRACT OF THE DISCLOSURE

A process for recovering hydrogen from hydrogen containing gases, especially refinery gases containing hydrogen at a concentration greater than 20 volume percent, by introducing a hydrogen extracting aromatic hydrocarbon into a hydrogenation catalyst zone at a point intermediate in said catalyst zone, in the presence of a hydrogen containing gas in countercurrent relationship to said aromatic hydrocarbon, removing a hydrogenated aromatic hydrocarbon effluent from the catalyst zone, introducing said effluent into a dehydrogenation catalyst zone at a point intermediate in said catalyst zone in the presence of an enriched hydrogen containing gas in countercurrent relationship to said effluent and recovering a hydrogen containing gas of at least about 90 volume percent hydrogen.

---

This invention relates to a hydrogen recovery process and more particularly to a hydrogen recovery process wherein increased concentrations of hydrogen are obtained from hydrogen containing refinery gases.

Reforming of hydrocarbons and particularly petroleum hydrocarbons involves dehydrogenation of naphthenes, dehydrogenation of paraffins, dehydrocyclization of paraffins, isomerization of normal paraffins to iso-paraffins, and hydrocracking of paraffins. The greater the severity of reforming conditions the greater the dilution of hydrogen produced in the dehydrogenation of naphthenes and the dehydrocyclization of paraffins with hydrocarbon fragments such as methane, ethane, and propane.

With the increase in demand for high purity (greater than 90 volume percent) hydrogen in modern refineries, it is becoming more important to be able to recover hydrogen from low purity hydrogen containing streams such as catalytic cracker, naphtha hydrotreater and reformer off gas streams. The recovered amount of hydrogen would be substantial if all refinery streams containing hydrogen in concentrations greater than 20 volume percent were processed to recover the hydrogen.

A hydrogen recovery process which has been proposed is to introduce an aromatic hydrocarbon together with a hydrogen containing refinery gas at elevated pressures and temperatures into a reactor containing a hydrogenation catalyst in downflow relationship to said hydrogenation catalyst. The effluent from the reactor consisting of gases, aromatic hydrocarbon, and hydrogenated aromatic hydrocarbon is introduced into a gas liquid separator wherein the gas is separated from the liquid materials. The recovered liquid material is then passed into a second reactor containing a dehydrogenation catalyst together with a hydrogen containing gas comprising over 90 volume percent hydrogen in downflow relationship to said dehydrogenation catalyst. The liquid material, that is, the effluent from the second reactor, is then passed into a second gas-liquid separator and a hydrogen rich gas is separated from the liquid material. This process can be referred to as a downflow gas-liquid separation process for the recovery of hydrogen.

It is therefore an object of this invention to recover hydrogen in increased concentrations while enhancing catalyst and aromatic hydrocarbon efficiency.

It has now been found that hydrogen can be recovered from hydrogen containing gases, especially refinery gases containing hydrogen at concentrations greater than 20 volume percent by a split flow hydrogen recovery process which comprises introducing an aromatic hydrocarbon in downward flow into a hydrogenation catalyst zone, said hydrogenation catalyst zone comprising a first hydrogenation catalyst zone below and a second hydrogenation catalyst zone above the point of entry of said aromatic hydrocarbon, introducing a hydrogen containing gas into said first hydrogenation catalyst zone in countercurrent relationship to said aromatic hydrocarbon, maintaining liquid in the second hydrogenation catalyst zone, recovering a hydrogenated aromatic hydrocarbon effluent from the first hydrogenation catalyst zone, introducing said effluent in downward flow into a dehydrogenation catalyst zone comprising a first dehydrogenation catalyst zone below and a second dehydrogenation catalyst zone above the point of entry of said effluent, introducing a hydrogen enriched gas into said first dehydrogenation catalyst zone in countercurrent relationship to said effluent, maintaining liquid in the second dehydrogenation catalyst zone and recovering an enriched hydrogen containing gas from the second dehydrogenation catalyst zone. Thus, it has been found that increased hydrogenation of an aromatic hydrocarbon and increased dehydrogenation of the effluent from the first catalyst zone is accomplished by the process of this invention. More particularly, it has been found that increased hydrogenation catalyst, efficiency and dehydrogenation catalyst efficiency is obtained by the process of this invention. In addition, the process of this invention can be practiced with the elimination of gas-liquid separation steps which follow the hydrogenation and the dehydrogenation steps of the prior art. Thus, the effluent from the first hydrogenation catalyst zone can be introduced directly into a dehydrogenation catalyst zone and a hydrogen enriched gas recovered directly from a second dehydrogenation catalyst zone in the absence of gas-liquid separation steps.

In carrying out the process of this invention the aromatic hydrocarbon material is introduced into a hydrogenation catalyst zone herein defined to include a first hydrogenation catalyst zone below and a second hydrogenation catalyst zone above the point of entry of the aromatic hydrocarbon. By the use of the term "above" is meant that the second hydrogenation and dehydrogenation catalyst zones are positioned such that the hydrogen containing gas and entrained liquid proceed from the first catalyst zone into the second catalyst zone in up flow relationship to the second catalyst zone. Thus, the second catalyst zone, either hydrogenation or dehydrogen, can be located above the first catalyst zone in a space dimensional sense or can be in a second reactor wherein the upflowing gases and entrained liquid flow from the first catalyst zone into a second catalyst zone. Within the first and second hydrogenation catalyst zones is present a catalyst which has hydrogenation activity under process conditions of temperature, pressure, and space velocity which are utilized during the hydrogenation step. The catalyst in the first hydrogenation catalyst zone can be either the same or different than the hydrogenation catalyst present in the second hydrogenation catalyst zone.

The aromatic hydrocarbon material upon entry into the hydrogenation catalyst zone proceeds in downflow relationship to said first hydrogenation catalyst zone. The hydrogen containing gas is introduced into the first hydrogenation catalyst zone at the lower extremity and/or at various levels throughout said first hydrogenation catalyst zone in countercurrent relationship to said first hydrogenation catalyst zone and in upflow relationship with liquid aromatic hydrocarbons which are entrained in the gas and proceed into the second hydrogenation catalyst zone. The gas which proceeds from the second catalyst zone can be partially or totally recycled into the hydrogen containing gas that enters the first hydrogenation catalyst zone. The hydrogenated aromatic hydrocarbon together with any non-hydrogenated aromatic hydrocarbon hereinafter called "effluent" which is obtained from the first hydrogenation catalyst zone is introduced into a dehydrogenation catalyst zone. The effluent however can be partially recycled into the aromatic hydrocarbon feed which enters the first hydrogenation catalyst zone. However, it is preferred that the total effluent be introduced into the dehydrogenation catalyst zone.

As in the case of the introduction of the aromatic feed into the hydrogenation catalyst zone, the effluent is introduced in downward flow into the first dehydrogenation catalyst zone. The first and second dehydrogenation catalyst zones comprise a dehydrogenation catalyst which has dehydrogenation activities under process conditions of temperature, pressure and space velocity which are utilized in the process of this invention. In addition, the dehydrogenation catalyst in the first catalyst zone can be either the same or different than the dehydrogenation catalyst present in the second catalyst zone.

An enriched hydrogen gas is introduced at the lower extremity and/or at various levels of the first dehydrogenation catalyst zone. An enriched hydrogen containing gas, usually containing over 90 volume percent hydrogen, is recovered on dehydrogenation of the effluent. Part of the enriched hydrogen gas which is obtained from the second dehydrogenation catalyst zone, can be recycled to the first dehydrogenation catalyst zone. In addition, the dehydrogenated effluent which proceeds through the first dehydrogenation catalyst zone can be recycled with fresh effluent which is obtained from the first hydrogenation catalyst zone. In addition, the aromatic hydrocarbon material which has been produced under dehydrogenation conditions (e.g. dehydrogenated effluent) can be recycled into the hydrogenation catalyst zone. It is preferred to carry out the process of this invention utilizing recycle of the dehydrogenated effluent to the hydrogenation catalyst zone.

A particular advantage of the process of this invention, in addition to the efficiency of the hydrogenation and dehydrogenation aspects of this invention, is the fact that the effluent from the first hydrogenation catalyst zone can be charged directly into the dehydrogenation catalyst zone. Thus not only can a gas-liquid separation step be eliminated, but in addition, cooling and heating steps can be eliminated since the effluent can be introduced into the dehydrogenation catalyst zone while above ambient temperature. The effluent, however, can be heated to a temperature higher than that present in the first hydrogenation catalyst zone and such heating step is contemplated within the scope of this invention. In addition, the aromatic hydrocarbon which is introduced into the hydrogenation catalyst zone can be heated prior to introduction such as up to hydrogenation temperature and in addition can be blended with the hydrogen containing refinery gas prior to introduction. Thus, the hydrogen containing gas can be introduced into the aromatic hydrocarbon as well as at the lower extremity and or at intermediate points in the first hydrogenation catalyst zone.

As stated above, liquid is maintained in both the second hydrogenation catalyst zone and the second dehydrogenation catalyst zone. The liquid that is present in the second hydrogenation catalyst zone usually comprises aromatic hydrocarbons which have been carried into the second catalyst zone by the rate of introduction of the hydrogen containing gases. The liquid present in the second dehydrogenation catalyst zone, is the liquid portion of the effluent which is carried forward by the hydrogen enriched gases which pass through the first dehydrogenation catalyst zone. It has been found that when these liquids are present in the second hydrogenation and dehydrogenation catalyst zone, increased hydrogenation and dehydrogenation are obtained. In general, liquids are maintained in the second hydrogenation and dehydrogenation catalyst zones by the rate of introduction of either a hydrogen containing gas or the enriched hydrogen (including recovered hydrogen) containing gas in the first hydrogenation and first dehydrogenation catalyst zones respectively, or by any other means as set forth above for the introduction of a hydrogen containing gas or an enriched hydrogen containing gas. In order to maintain a liquid in the second hydrogenation catalyst zone, hydrogen containing gas rates in the first hydrogenation catalyst zone of at least 3,000 s.c.f. per barrel, preferably from 3,000 s.c.f. per barrel up to about 25,000 s.c.f. per barrel are utilized. In the case of the second dehydrogenation catalyst zone, liquid is maintained in the second dehydrogenation catalyst zone by utilizing an enriched hydrogen circulation rate of moles hydrogen per mole of effluent of from 1 to about 100 more preferably from about 3 to about 50. Enriched gas circulation rates of from 3,000 to about 25,000 s.c.f. per barrel in general provide the hydrogen circulation ratio on a mole basis as set forth above.

The hold-up of liquid material in the first hydrogenation catalyst zone and first dehydrogenation catalyst zone may be varied somewhat by varying the upward flow of the hydrogen containing gas and enriched gas respectively or by any other methods obvious to those skilled in the art. In general it is preferred to have a liquid hold-up wherein the liquid level of the aromatic hydrocarbon and the effluent respectively are maintained so as to maximize the contact of the aromatic hydrocarbon and effluent with the catalyst present in the first hydrogenation catalyst zone and first dehydrogenation catalyst zone respectively.

The hydrogenation and dehydrogenation process conditions can be varied over a wide range, those conditions such as pressure, temperature and space velocity which are utilized being those which produce the maximum amount of enrichment in the off gas from the second hydrogen dehydrogenation catalyst zone.

The conditions that are utilized in the first hydrogenation catalyst zone are temperatures of from about 200° F. to about 800° F. preferably from about 300° F. to about 650° F., pressures of from about 150 to about 2500 p.s.i.g. preferably from about 500 to about 1500 p.s.i.g., liquid hourly space velocity of from about 0.25 to about 10 more preferably from about 0.5 to about 4.0, hydrogen containing gas rate of from about 3,000 to about 70,000 more preferably from about 6,000 to about 25,000 standard cubic feet per barrel of feed. In general the above conditions are applied equally to conditions that can be utilized in both the first and the second hydrogenation catalyst zones. However, the hydrogen containing gas rate in the second hydrogenation catalyst zone may be slightly higher depending upon the amount of hydrogen containing gas which is dissolved in the aromatic hydrocarbon prior to introduction into the hydrogenation catalyst zone. In addition the temperatures present in both the first and second hydrogenation catalyst zone can be different, those temperatures which are preferred being those which do not produce cracking or decomposition of the aromatic hydrocarbon.

The conditions which are utilized in the dehydrogenation catalyst zone are in general temperatures of from about 700 to about 1,000° F. or preferably from about 750° F. to about 950° F. pressures of from about 50 to about 2,000 p.s.i.g. preferably from about 200 to about 1,000 p.s.i.g., liquid hourly space velocity of from about 0.5 to about 100 more preferably from about 1 to about 30 volumes of liquid per volume of catalyst per hour and enriched hydrogen circulation rates in moles purified hydrogen per mole of liquid effluent of from about 1 to about 100 more preferably from about 3 to about 50. In general the conditions utilized in both the first dehydrogenation catalyst zone and second dehydrogenation catalyst zone can vary within the limits as set forth above. However, in carrying out the process of this invention hydrogen circulation rates in the second dehydrogenation catalyst zone may be greater than those present in the first dehydrogenation catalyst zone since dehydrogenation of the effluent will produce greater quantities of liberated hydrogen in the second catalyst zone. Ordinarily it is preferred that the temperature in both the dehydrogenation catalyst zones be maintained approximately the same.

Typical examples of extracting agents are pure single or multi-ring aromatic hydrocarbons, pure single or multi-ring hydrocarbons having one or more saturated, i.e., alkyl sidechains, e.g., benzene, toluene, xylene, trimethyl benzenes, ethyl benzene, diethyl benzene, ethyl-methyl benzene, naphthalene, methyl naphthalene, anthracene, methyl anthracene, phenanthrene, methyl phenanthrene, mixtures of the foregoing, aromatic petroleum fractions such as "synthetic tower" bottoms obtained in the catalytic cracking of gas oil, mixtures of aromatic hydrocarbons recovered from the extract obtained by extraction, aromatic hydrocarbon-containing naphtha, kerosine "synthetic tower" bottoms, and, in general, any aromatic hydrocarbon mixture produced by solvent extraction with a selective solvent such as sulfur dioxide, alkylene glycols, e.g., diethylene glycol, triethylene glycol, "Chlorex" and others. In general, the hydrogen extracting agent comprises aromatic hydrocarbons substantially devoid of hydrogenatable material not readily dehydrogenatable at extracting agent regeneration conditions without the production of unsaturated hydrocarbons. Generally, the extracting agent will have from 6 to about 40 carbon atoms more preferably from 6 to about 20 carbon atoms.

Suitable hydrogenation catalysts are hydrogenation catalysts having a hydrogenation component selected from the group consisting of the metals having atomic numbers 44 to 46 inclusive and 76 to 78 inclusive on a refractory oxide base comprising alumina, silica-alumina, silica-zirconia. The hydrogenation catalyst can be selected on the basis of the catalyst poisons present in the gas from which hydrogen is to be recovered. Thus, when the hydrogen-containing gas contains hydrogen sulfide it is preferred to use a catalyst which is not seriously inactivated by sulfur, e.g., having a hydrogenation component such as nickel-tungsten sulfide, tungsten disulfide, nickel-molybdenum sulfide. On the other hand, when the sulfur content of the hydrogen-containing gas to be treated does not exceed 30 p.p.m. (parts per million) by weight of the acceptor, platinum-group metal, hydrogenating catalysts such as a catalyst comprising about 0.30 to about 1.00 percent by weight of platinum, palladium, osmium, iridium on, for example, an alumina base can be used.

Suitable dehydrogenating catalysts are the oxides and sulfides of the group VI-B metals of the Periodic Arrangement of the Elements and particularly chromium oxide, molybdenum, and mixtures of the oxides of chromium and molybdenum. The aforesaid oxides and sulfides are used on a base or support comprising at least one refractory oxide such as alumina, silica-zirconia, silica-alumina and silica magnesia an example of which comprises about 18 percent by weight chromium oxide and the balance alumina.

The invention can be better appreciated by the following non-limiting examples.

EXAMPLE I

To a 1500 cc. split flow vertical pressure reactor equipped with a charge stock inlet tube at the intermediate point in said reactor, an effluent exit tube at the bottom of the reactor, gas inlet and exit tubes at the bottom and top of the reactor respectively, a first and second fixed screen catalyst bed containing 300 cc. each of a nickeloxide (3 wt. percent) molybdenum oxide (13.6 wt. percent) on alumina below and above the charge stock inlet tube, respectively, and heating means is charged a preheated naphthalene charge stock at a temperature of approximately 250° F. in downflow relationship to the first hydrogenation catalyst bed at a space velocity of volumes of liquid per volume of catalyst per hour of 2.0. A 33 volume percent hydrogen containing gas is introduced through the gas inlet tube in countercurrent relationship to the naphthalene at a gas rate of 12,000 s.c.f. per barrel. A temperature of 700° F. and a pressure of 1500 p.s.i.g. are maintained in the first and second hydrogenation catalyst beds. A hydrogenated naphthalene effluent and depleted hydrogen containing gas are removed from the bottom and top of the reactor respectively. The effluent is charged to a second reactor equipped with the same means as the first reactor and catalyst beds comprising chromium oxide (16 wt. percent) on alumina (84 wt. percent). A temperature of 700° F., a pressure of 500 p.s.i.g., an effluent liquid hourly space velocity of 2.0 (volumes of liquid per volume of catalyst per hour) and a 90.25 volume percent hydrogen containing gas circulation rate of 12,000 s.c.f. per barrel are maintained. A gas is recovered from the second catalyst zone which has an average hydrogen concentration of 91 volume percent over a 6 hour period. The naphthalene produced in the first dehydrogenation catalyst bed is removed and recycled to the preheated naphthalene stream.

EXAMPLE 2

To a split flow pressure reactor as described in Example 1 utilizing the same catalyst is charged an aromatic hydrocarbon having the following properties

| | |
|---|---|
| API gravity | 29.6 |
| ASTM distillation, ° F.: | |
| IBP–10 | 470–568 |
| 20–30 | 560–595 |
| 40–50 | 600–605 |
| 60–70 | 611–618 |
| 80–90 | 627–640 |
| 95–EP | 655–674 |
| Nitrogen, p.p.m. | 1492 |
| Sulfur, wt. percent | 0.61 |
| Bromine number | 13.5 |
| Aromatics (Watson), wt. percent | 39.1 |
| Dinuclear aromatics, wt. percent | 15.6 | at a temperature of approximately 215° F. in downflow relationship to the first hydrogenation catalyst bed at a space velocity of volumes of liquid per volume of catalyst per hour of 1.5. A 25 volume percent hydrogen containing gas is introduced through the gas inlet tube in countercurrent relationship to the aromatic hydrocarbon at a gas rate of 20,000 s.c.f. per barrel. A temperature of 750° F. and a pressure of 1500 p.s.i.g. are maintained in the first and second hydrogenation catalyst beds. A hydrogenated aromatic hydrocarbon effluent and depleted hydrogen containing gas are removed from the bottom and top of the reactor, respectively. The effluent is charged to the second reactor and a temperature of 750° F., a pressure of 500 p.s.i.g. an effluent liquid hourly space velocity of 1.5 (volumes of liquid per volume of catalyst per hour) and a 90% by volume hydrogen containing gas circulation rate of 10,000 s.c.f. per barrel are maintained. A gas is recovered from the second catalyst zone which has an average hydrogen concentration of 92 volume percent over a 5 hour period. The aromatic hydrocarbon produced in the first dehydrogenation catalyst bed is removed and recycled to the preheated aromatic hydrocarbon stream.

The process of this invention is particularly advantageous since it increases the aromatic hydrocarbon, hydrogenation catalyst and dehydrogenation catalyst efficiency as compared to a prior art downflow hydrogen recovery process. In addition, the gas liquid separation steps following hydrogenation and dehydrogenation can be eliminated in the process of this invention. The process of this invention provides for the recovery of high concentration hydrogen containing gases while minimizing the amount of aromatic hydrocarbon, catalyst and equipment that is necessary to produce such enriched hydrogen gases.

While this invention has been described with various specific examples and embodiments it is to be understood that the invention is not limited thereto and that it can be variously practiced within the scope of the following claims.

We claim:

1. A process for recovering a substantially enriched hydrogen of at least about 90% by volume which comprises:
   (a) introducing an aromatic hydrocarbon in downward flow into a hydrogenation catalyst zone, said hydrogenation catalyst zone comprising a first hydrogenation catalyst zone below and a second hydrogenation catalyst zone above the point of entry of said aromatic hydrocarbon;
   (b) introducing an impure hydrogen containing gas stream into said first hydrogenation catalyst zone in countercurrent relationship to said aromatic hydrocarbon, and maintaining the aromatic containing material as a liquid in the second hydrogenation catalyst zone by introducing the hydrogen containing gas at a rate in the first hydrogenation catalyst zone of at least 3,000 s.c.f. per barrel;
   (c) recovering a hydrogenated aromatic hydrocarbon effluent from the first hydrogenation catalyst zone;
   (d) introducing said effluent in downward flow into a dehydrogenation catalyst zone comprising a first dehydrogenation catalyst zone below and a second dehydrogenation catalyst zone above the point of entry of said effluent;
   (e) introducing a hydrogen enriched gas into said first hydrogenation catalyst zone in countercurrent relationship to said effluent, and maintaining a liquid phase in the second dehydrogenation catalyst zone by utilizing an enriched hydrogen circulation rate of moles of hydrogen per mole of effluent of from about 3 to 50;
   (f) recovering said enriched hydrogen containing gas of at least about 90% by volume from the second dehydrogenation catalyst zone.

2. A process of claim 1 wherein the hydrogen containing gas is introduced at a rate of from 3,000 s.c.f. per barrel to 70,000 s.c.f. per barrel and the aromatic hydrocarbon contains from 6 to about 40 carbon atoms.

3. A process of claim 1 wherein the effluent from the hydrogenation catalyst zone is introduced directly into the dehydrogenation catalyst zone and which comprises the additional steps of recovering a dehydrogenated effluent from the first dehydrogenation catalyst zone and recycling dehydrogenated effluent to the aromatic hydrocarbon.

4. A process of claim 2 wherein the effluent from the first hydrogenation catalyst zone is introduced directly into the dehydrogenation catalyst zone and which comprises the additional steps of recovering a dehydrogenated effluent from the first dehydrogenation catalyst zone and recycling said dehydrogenated effluent to the aromatic hydrocarbon.

5. A process of claim 1 wherein the aromatic hydrocarbon is naphthalene.

6. A process of claim 2 wherein the aromatic hydrocarbon is naphthalene.

7. A process of claim 4 wherein the aromatic hydrocarbon is naphthalene.

8. A process of claim 1 wherein there is present in the hydrogenation catalyst zone a hydrogenation catalyst selected from the group consisting of platinum, palladium, osmium, iridium and mixtures thereof on a support selected from the group consisting of alumina, silica alumina, silica zirconia and mixtures thereof and there is present in the dehydrogenation catalyst zone a catalyst selected from the group consisting of chromium oxide, molybdenum oxide on a support selected from the group consisting of alumina, silica-alumina, and silica-magnesia.

9. A process of claim 2 wherein there is present in the hydrogenaiton catalyst zone a hydrogenation catalyst selected from the group consisting of platinum, palladium, osmium, iridium and mixtures thereof on a support selected from the group consisitng of alumina, silica alumina, silica zirconia and mixtures thereof and there is present in the dehydrogenation catalyst zone a catalyst selected from the group consisting of chromium oxide, molybdenum oxide on a support selected from the group consisting of alumina, silica-alumina, and silica-magnesia.

10. A process of claim 7 wherein there is present in the hydrogenation catalyst zone a hydrogenation catalyst selected from the group consisting of platinum, palladium, osmium, iridium and mixtures thereof on a support selected from the group consisting of alumina, silica alumina, silica zirconia and mixtures thereof and there is present in the dehydrogenation catalyst zone a catalyst selected from the group consisting of chromium oxide, molybdenum oxide on a support selected from the group consisting of alumina, silica-alumina, and silica-magnesia.

11. A process of claim 1 wherein the aromatic hydrocarbon is toluene.

12. A process of claim 2 wherein the aromatic hydrocarbon is toluene.

13. A process of claim 4 wherein the aromatic hydrocarbon is toluene.

References Cited

UNITED STATES PATENTS

| 2,328,828 | 9/1943 | Marschner | 32—212X |
| 3,246,951 | 4/1966 | Ramella | 23—212 |
| 3,258,420 | 6/1966 | Dalson et al. | 23—212X |

EDWARD STERN, Primary Examiner

U.S. Cl. X.R.

260—668